(12) United States Patent
Saliga et al.

(10) Patent No.: US 7,499,673 B2
(45) Date of Patent: Mar. 3, 2009

(54) CONFIGURABLE DIVERSITY ANTENNA SYSTEM FOR WIRELESS ACCESS POINTS

(75) Inventors: Stephen V. Saliga, Akron, OH (US); Fred Jay Anderson, Lakeville, OH (US)

(73) Assignee: Cisco Technology, Inc.

( * ) Notice: Subject to any disclaimer, the term of this patent is extended or adjusted under 35 U.S.C. 154(b) by 717 days.

(21) Appl. No.: 10/806,651

(22) Filed: Mar. 23, 2004

(65) Prior Publication Data

US 2005/0227658 A1    Oct. 13, 2005

(51) Int. Cl.
*H04B 1/00* (2006.01)
*H04B 15/00* (2006.01)
*H04B 7/14* (2006.01)
*H04M 1/00* (2006.01)

(52) U.S. Cl. .................. 455/63.4; 455/25; 455/575.7

(58) Field of Classification Search ............... 455/63.4, 455/13.3, 25, 562.1, 575.7, 82, 83, 97, 106, 455/107; 381/352, 160; 343/738, 755, 761, 343/775, 834, 839, 878, 912
See application file for complete search history.

(56) References Cited

U.S. PATENT DOCUMENTS

| 4,821,045 A * | 4/1989 | Capdepuy et al. ........ 343/781 R |
| 6,434,372 B1 * | 8/2002 | Neagley et al. ............ 455/106 |
| 7,233,627 B2 * | 6/2007 | Proctor et al. ............... 375/267 |

* cited by examiner

*Primary Examiner*—Eugene Yun
(74) *Attorney, Agent, or Firm*—Tucker Ellis & West LLP

(57) ABSTRACT

A configurable antenna system and method of implementing is disclosed, having particular use with a wireless access point of the type used with a wireless local area network. The antenna system includes an antenna arrangement for selectively varying between first and second operational positions. In the first operational position, the antenna arrangement operates in an omni-directional antenna mode. In the second operational position, the antenna arrangement operates in a directional antenna mode. A signal reflecting member is further provided for cooperating with the antenna arrangement in the second operational position, to substantially establish the antenna arrangement in a directional configuration.

26 Claims, 5 Drawing Sheets

CONFIGURABLE DIVERSITY ANTENNA SYSTEM FOR WIRELESS ACCESS POINTS

BACKGROUND OF THE INVENTION

Wireless networking is becoming increasingly common in offices, retail establishments and other networked facilities. A wireless local area network (WLAN) has obvious benefits over a typical wired LAN in that it offers client users mobility to move around from place to place within a coverage area or "cell," without having to operate from a wired port in a fixed location. And by not relying on wired ports, a WLAN reduces the amount of wiring necessary in a networked area, resulting in reduced deployment cost and lower ongoing maintenance.

In a WLAN, a client device (such as a laptop computer or hand-held device) includes a radio component such as a wireless card having an antenna and suitable radio electronics circuitry for converting electronic signals back and forth into wireless radio frequency signals. The mobile client device communicates with the WLAN through a wireless Access Point (AP) that also includes an antenna system with a radio electronic package, and further includes a wired connection to the network, which can include one or more servers, and shared peripheral devices such as printers, etc.

At the present time, WLANs typically operate in either the 2.4 GHz or the 5 GHz wireless radio bands, in accordance with the IEEE 802.11 (a) and (g) wireless protocols. However, with the increase in wireless networking, there is an ongoing need to improve wireless throughput and increase the number of channels through which wireless clients may communicate with the APs. As a result, there is interest in utilizing the unlicensed UNII bands.

The UNII bands are specified by the Federal Communications Commission (FCC). These UNII bands are low-power bands adjacent to higher-power bands licensed for fixed wireless, commercial services, etc. The power requirements for UNII bands are kept low to as to avoid interference with adjacent licensed and military usage bands. In order to preserve the low-power requirements, the FCC rules for the UNII-1 band (5150 MHz-5250 MHz) require that radio devices operating in these bands have integral or captured antennas, rather than removable antenna devices joined to the radio with a connector. The antenna cannot be replaced with a higher-gain antenna that would violate the FCC power limitations. WLAN devices which operate in the UNII-1 band may not employ an antenna connector, prohibiting the user from selecting a specific antenna to meet an application requirement. This lack of flexibility, which is not encountered in equipment designed for UNII-2, 3 and the ISM bands, must be resolved in accordance with the UNII-1 standards.

It would also be desirable to provide omni-directional coverage as well as directional coverage patterns, so as to provide an end user with a variety of deployment options. Most users in the 2.4 GHz band currently deploy either a low-gain omni-directional antenna arrangement in a ceiling mount configuration, or, alternatively, a low gain patch antenna arrangement in a wall mount configuration. Therefore, there is a strong motivation to provide the same types of antenna patterns in an AP operating in the UNII bands. However, the omni-directional antenna may operate with a different gain than a directional antenna leading to different peak radiated emissions levels from the system. So an AP system which is capable of exceeding these emissions levels by virtue of its conducted power capability and its complement of antenna deployment alternatives must be able to adjust its conducted transmit power in order to maintain compliance with all FCC rules.

SUMMARY OF THE INVENTION

The difficulties and drawbacks associated with legacy systems are overcome by the presently disclosed embodiments that include a configurable antenna system and method of implementing adaptive power control, having particular use with a wireless access point of the type used in a wireless local area network. The antenna system includes an antenna arrangement for selectively varying between first and second operational positions. In the first operational position, the antenna arrangement operates in an omni-directional antenna mode. In the second operational position, the antenna arrangement operates in a directional antenna mode. A signal reflecting member is further provided for cooperating with the antenna arrangement in the second operational position, to substantially establish the antenna arrangement in a directional configuration.

As will be realized, the presently disclosed embodiments are capable of other and different embodiments and its several details are capable of modifications in various respects, all without departing from the invention. Accordingly, the drawings and description are to be regarded as illustrative and not restrictive.

DETAILED DESCRIPTION OF THE INVENTION

Figure 1:
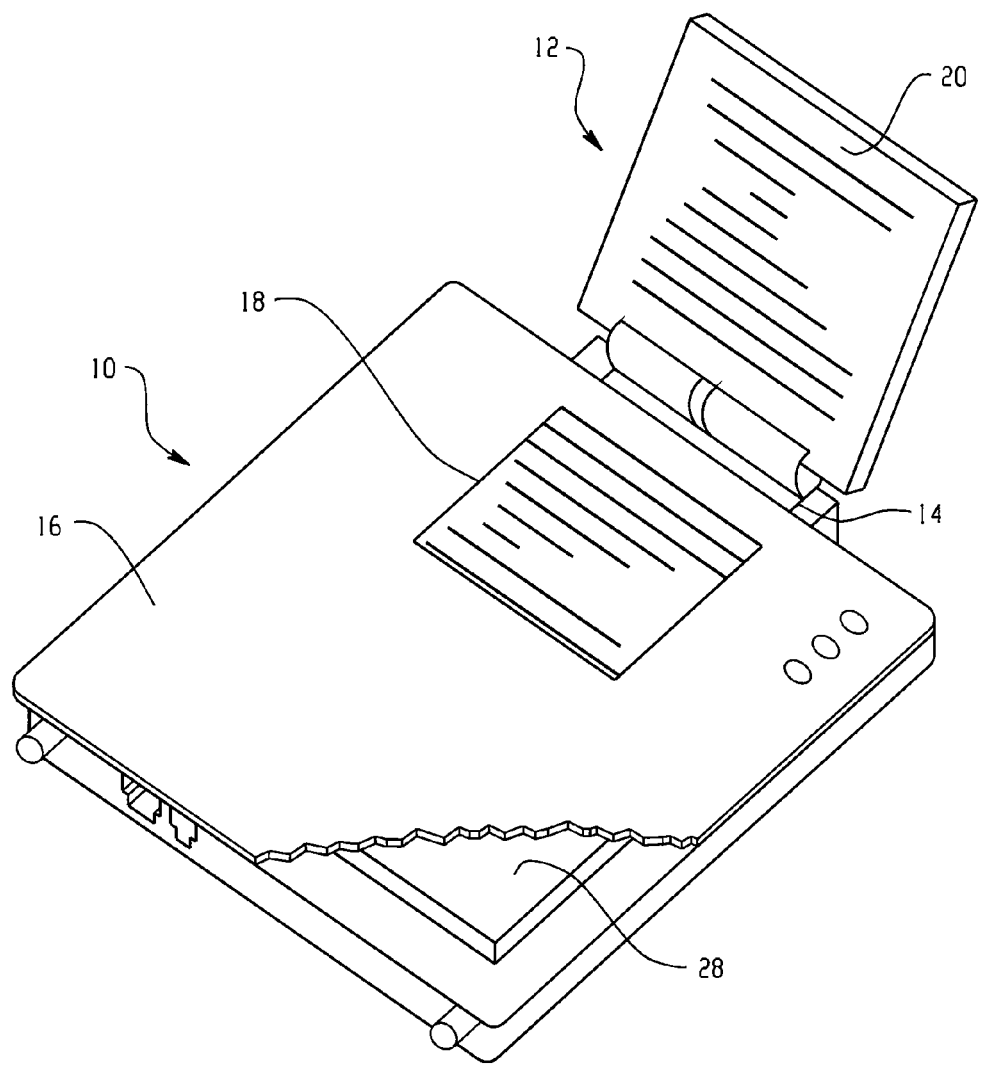
FIGS. 1 and 2 are oblique views respectively indicating a wireless access point using the antenna system in accordance with the present embodiments.

The present embodiments are related to a previous invention by the present assignee disclosed in U.S. Ser. No. 10/091,164, entitled "Configurable Diversity Antenna for UNII Access Point," the disclosure of which is hereby incorporated by reference. Reference is now made to the figures, where it should be understood that like reference numerals refer to like elements.

FIG. 1 shows a wireless access point 10, for use with a WLAN, and including a configurable antenna system 12 in accordance with the present embodiments. Of course, it should be appreciated that the present antenna system can be used with other suitable wireless telecommunications systems besides a wireless AP for use with a WLAN. The antenna system 12 includes an antenna arrangement 20 for selectively varying between first and second operational positions. In the first operational position, as particularly shown in FIG. 1, the antenna arrangement 20 operates in an omni-directional antenna mode. In the second operational position, as particularly shown in FIG. 2, the antenna arrangement 20 operates in a directional antenna mode.

In the preferred embodiment, the antenna system 12 includes a pivot member 14, preferably a hinge or other suitable mechanism, for pivotally varying the antenna arrangement 12 between the first and second antenna positions. As shown in FIG. 1, the first operational position is preferably a position substantially perpendicular with respect to a housing component 16, for encasing and enclosing the internals of the AP or other wireless device. It is of course appreciated that the wireless access point 10, as shown in the figures, includes a radio component 28 having suitable radio electronics circuitry for converting electronic signals back and forth into wireless radio frequency signals, as is known in the art. As is understood, the present AP can have a physical layer (PHY) for exchanging wireless signals. The radio component also includes an implementation such as a media access control layer (MAC), which can be hardware, firmware, or software, for converting signals between a wireless protocol and a wired network protocol. Preferably, the wireless protocol is the IEEE 802.11 wireless protocol and the wired network protocol is the IEEE 802.3 wired network protocol. Of course, any suitable protocols can be employed without departing from the present embodiments.

Figure 2:
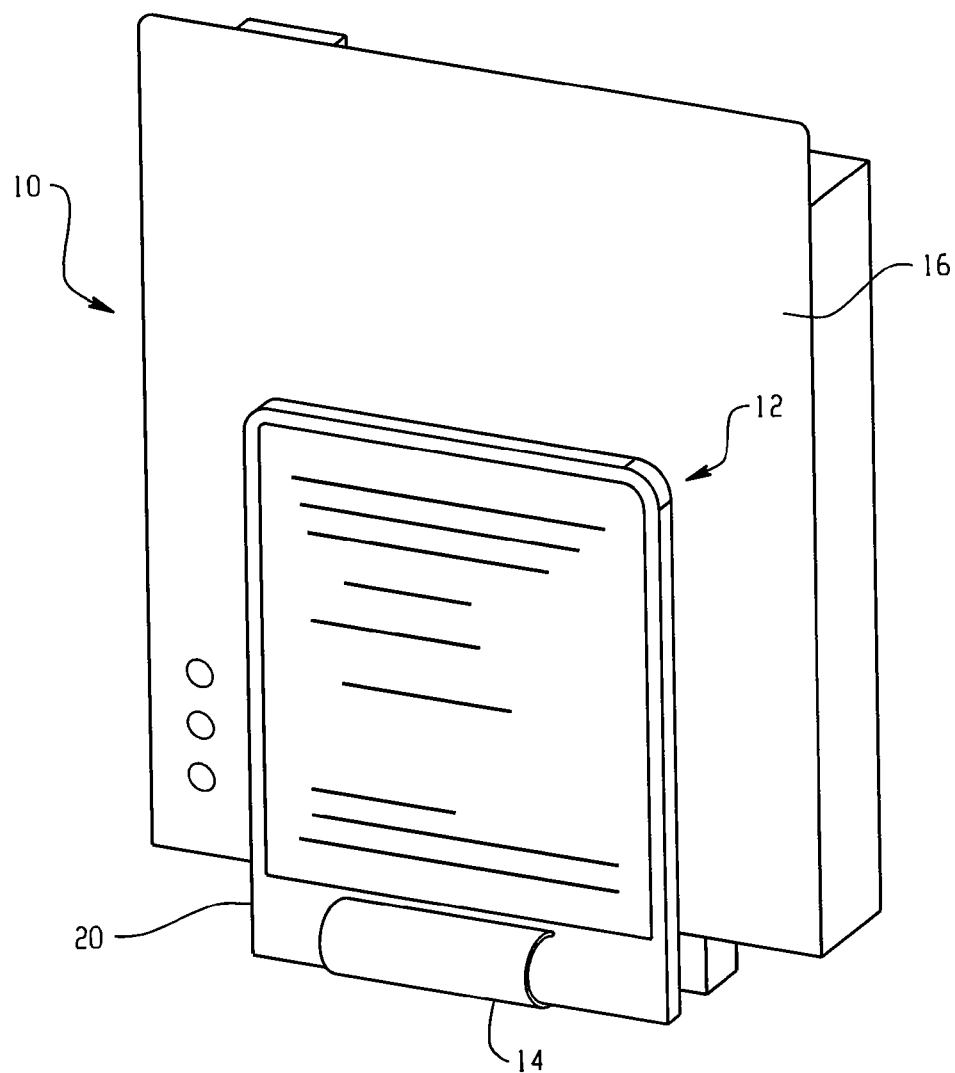

As shown in FIG. 2, the second operational position of the antenna arrangement 12 is substantially parallel with respect to the housing component 16. In this second operational position, the antenna arrangement 16 cooperates with a signal reflecting member 18, to substantially establish the antenna arrangement in a directional antenna mode configuration. Specifically, in the second operational position, the antenna arrangement 12 is substantially proximate to the signal reflecting member 18, so as to provide a signal reflection from the antenna arrangement. In this way, the entire signal from the antenna arrangement 12 will reflect in a direction perpendicular to the signal reflecting member 18, and in this way provide a directional antenna operating mode without switching to a different antenna type or modifying the antenna, thereby resulting in greater simplicity and reduced costs.

The signal reflecting member 18 is formed of a metal, a metal composite or other suitable material that reflects radio frequency signals. In the preferred embodiment, access point housing 16 is formed of a suitable metal material: die-cast aluminum, formed aluminum or the like. In this way, the signal reflecting member 18 is formed integrally with the metal access point housing 16, so as to be one seamless component, and thereby reducing the need for separate manufacturing operations. However, it should be understood that the signal reflecting member 18 can also be a discrete component mounted inside another type housing 16, such as a plastic housing or the like.

Figure 7:
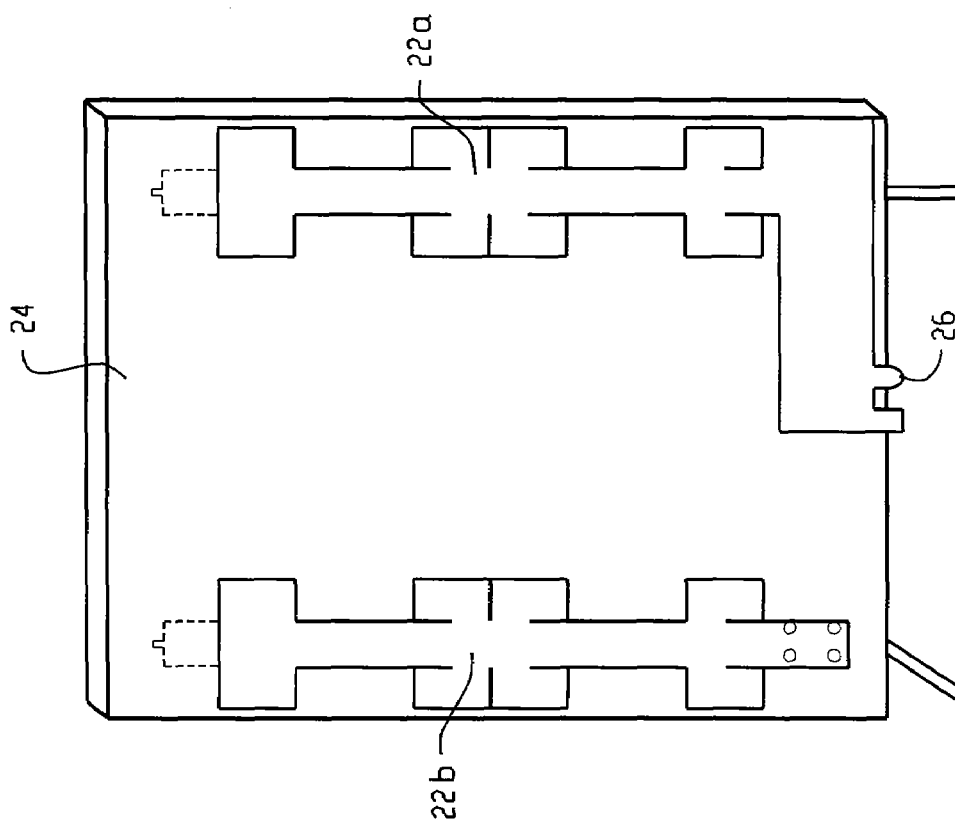
FIGS. 6 and 7 are respective face-on views respectively of a front side and a back side of the antenna arrangement in accordance with the present embodiments.
Figure 6:
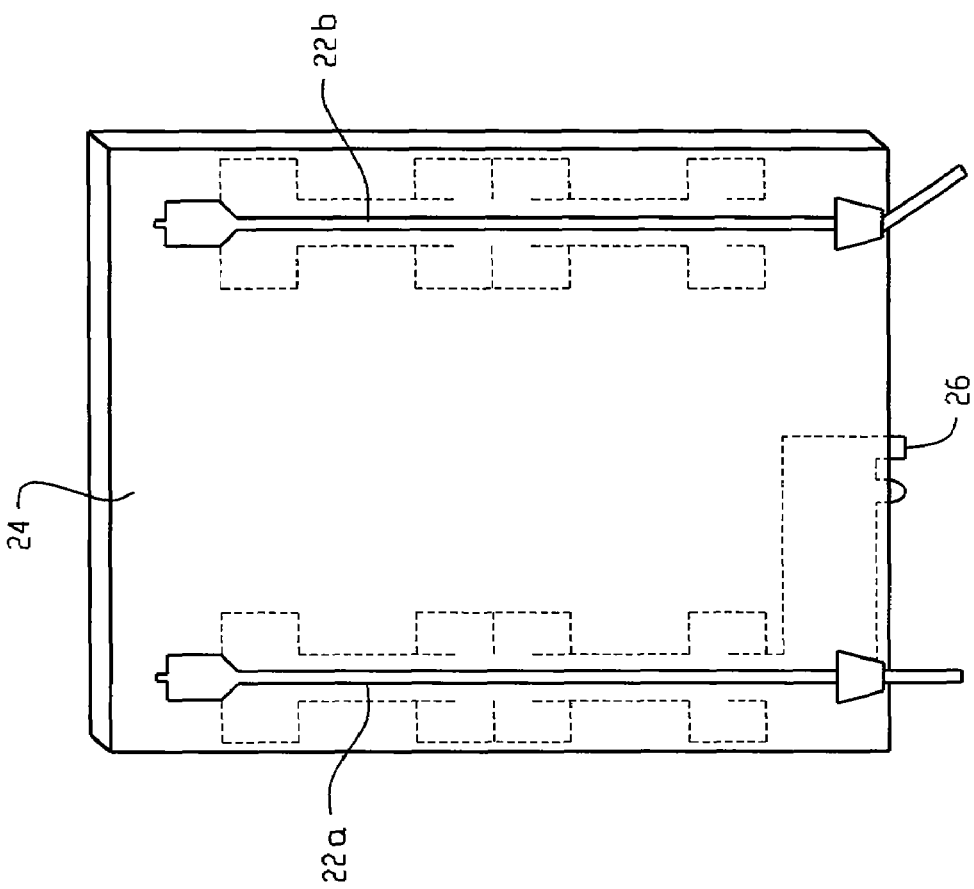

As shown in FIGS. 6 and 7, the present antenna arrangement 12 preferably includes a diversity pair of omni-directional antennas 22a, 22b. Preferably, these omni-directional antennas 22a, 22b are formed on a circuit board 24, where FIG. 6 shows a front side and FIG. 7 shows a back side of such a circuit board 24. As can be seen, each of the omni-directional antennas 22a, 22b have elements formed on the front and back sides of the circuit board 24, so as to produce a "co-linear" antenna array that improves antenna gain, approaching a desired level of about 5 dBi. In this way, the present omni-directional antennas are deployed so that they may be used together in a "diversity" fashion, i.e. in which the radio MAC uses a diversity algorithm to choose the "best" antenna with which to transmit or receive to a particular wireless client located within the coverage area. The antenna arrangement 12 as a whole can then be rotated to the desired vertical orientation.

Figure 5:
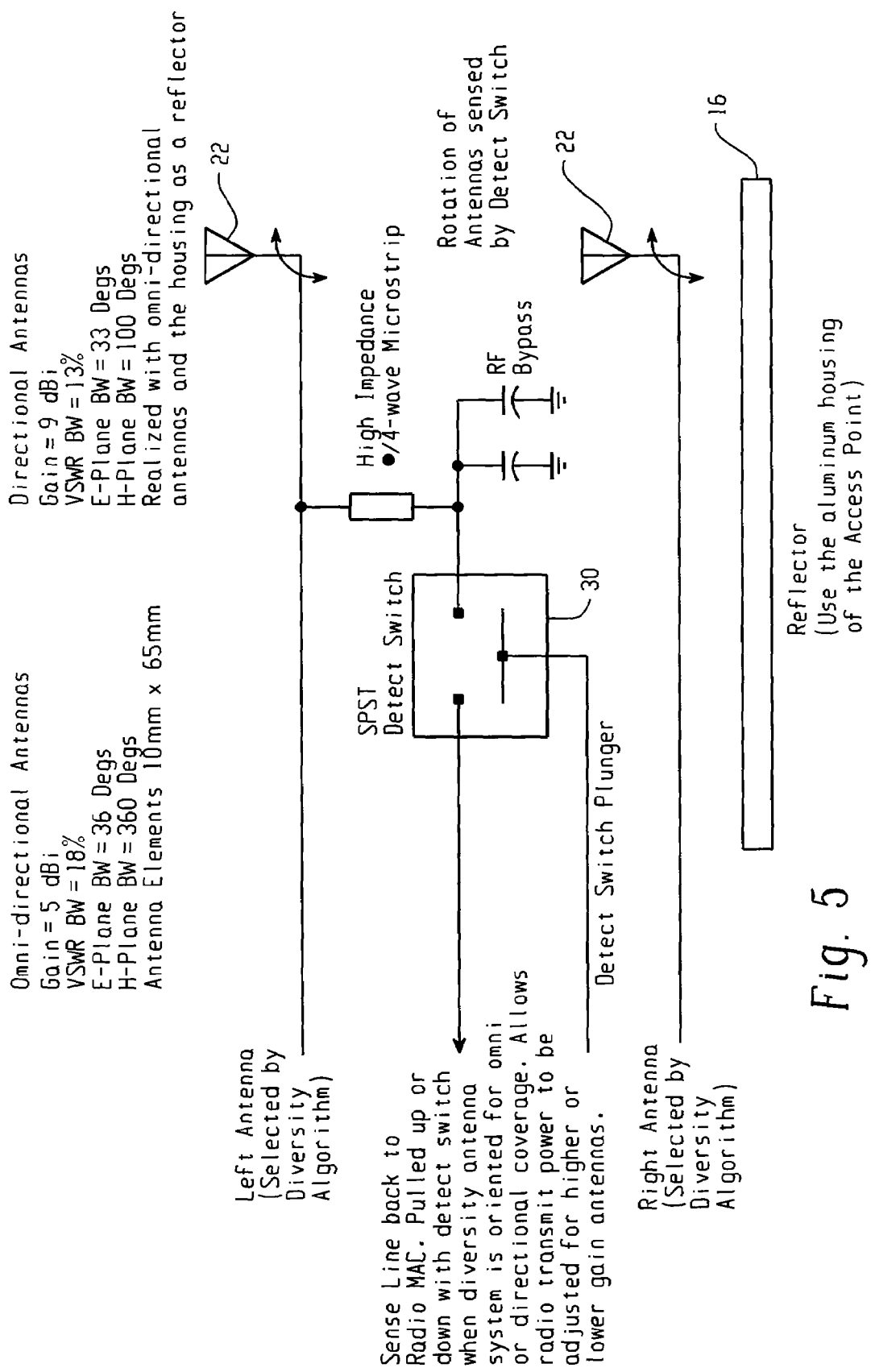
FIG. 5 is a block diagram indicating the configuration of the antenna position detection circuit in accordance with the present embodiments.

In the directional mode, all the power is radiated into a particular region, rather than being radiated in a 360 degree pattern, as with the omni-directional mode. Thus, the resultant directional coverage pattern has significantly higher gain than the omni-directional pattern. In order to maintain compliance with the FCC antenna gain guidelines for UNII transmitters, it may be necessary to scale back conducted transmitter power in the directional mode, to keep the radiated power within the FCC limits, and alternatively, to maintain a field strength comparable to that of the omni-directional deployment. As also shown in FIGS. 6 and 7, the omni-directional antennas 22 are connected to a switch 26 for detecting whether the antenna arrangement is in the first or second operational positions, for respectively enabling the omni-directional antenna mode or the directional operational mode. As shown in FIG. 5, the switch 26 is preferably a SPST (Single Pole Single Throw) detect switch connected with a DC line to one of the dipole antennas, e.g. a "left" antenna 22a as indicated. The switch 26 detects the orientation of the antenna arrangement 12 and drives an input/output (I/O) line to the MAC processor either high or low. When the antenna arrangement 12 is pivoted to the vertical, omni-directional operating position, switch 26 is open, and the I/O line is pulled up. This is read by the MAC that higher conducted power is allowed. When the antenna arrangement 12 is pivoted to the horizontal, directional operating position, the line is pulled down. The MAC processor responds by reducing the transmit power so that the maximum radiated emissions level is not exceeded for the directional mode. The quarter-wave line shown in the figure is simply used as an impedance transformer so that an RF bypass may be used to control the RF impedance at the switch. By providing an RF short-circuit to ground at this point, the transformation through the λ/4 line yields a high impedance on the RF transmission line; thus, the 50 Ω impedance of the antenna is not disturbed and no power is lost to the switch.

Figure 3:
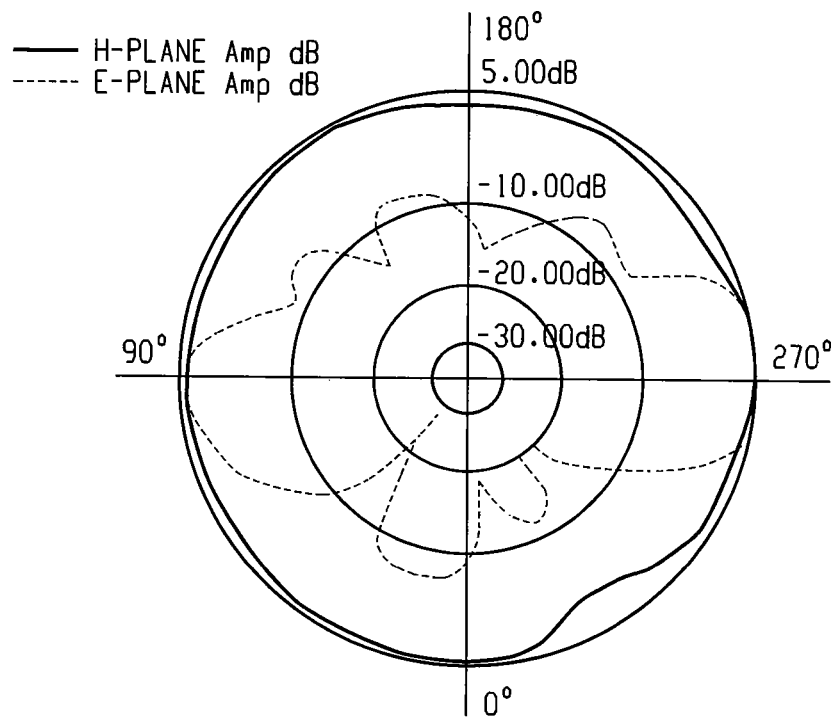
FIGS. 3 and 4 are plots indicating the antenna patterns for the present antenna system in respectively the omni-directional and directional modes.
Figure 4:
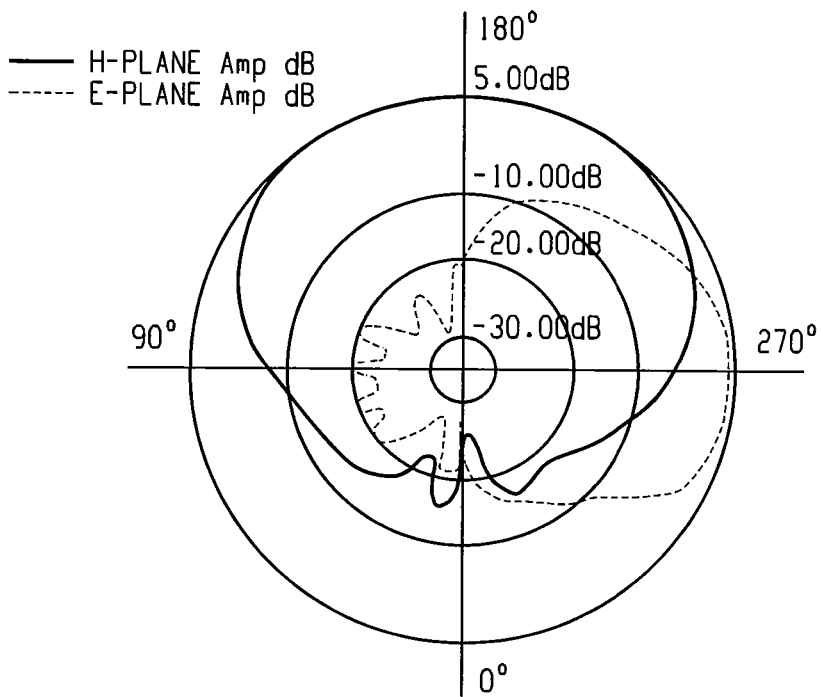

The omni-directional patterns for the E- and H-Planes of the present system are shown together in FIG. 3. The directional patterns for the E- and H-Planes of the present system are shown together in FIG. 4. It is appreciated that the "E-Plane" signifies the principal plane parallel to the electric field vector of the radio frequency signal, and the "H-Plane" indicates the principal plane parallel to the magnetic field vector, where the H-Plane is a plane perpendicular to the E-Plane. These varying coverage patterns by virtue of two different antenna configurations.

Typical WLAN diversity antennas are dipoles or other type of omni-directional antennas. However, the present inventors have discovered that when these omni-directional antennas are oriented parallel to the metallic AP housing, the signal becomes directive. In omni-directional mode, two identical antennas are deployed, each of which produces the same radiation pattern. They are merely deployed as a diversity pair in which the better omni-directional antenna is selected for transmitting to a particular wireless client. When they are oriented for use with the signal reflector 18, each antenna still produces the same directional pattern and they are still used as a diversity pair. The radio MAC determines which antenna, left or right, is optimal for a given AP-client communication transaction. The detect switch allows "automatic" reduction of conducted power by the device when required to maintain radiated power limits, without requiring user intervention. This is important in order to achieve compliance with regulatory standards set forth by the respective governmental authorities, thereby satisfying the intent of the regulations and preventing emissions in excess of the rules.

The present system thus allows a system that provides considerable flexibility in terms of a configurable operating mode that can especially be useful in the UNII band, where radio devices must have an integral antenna. The present system also improves performance and efficiency while reducing the complexity of the antenna arrangement and the related circuitry of previous-type antenna systems, thereby reducing manufacturing cost. Thus, the present invention realizes economic benefits in addition to providing improved performance.

As described hereinabove, the presently disclosed embodiment solves many problems associated with previous type solutions. However, it will be appreciated that various changes in the details, materials, arrangements of parts and other suitable variations as have been herein-described and illustrated in order to explain the nature of the present embodiments may be made by those skilled in the area within the principle and scope of this disclosure, and will be expressed in the appended claims.

We claim:

1. A configurable antenna system comprising:
   an antenna arrangement configured to selectively vary between first and second operational positions;
   a signal reflecting member positioned to cooperate with the antenna arrangement while the antenna arrangement is in the second operational position, to establish a directional antenna mode configuration that is perpendicular to the signal reflecting member; and
   a pivot member coupled to the antenna arrangement for folding the antenna between the first and second operational positions;
   wherein in the first operational position, the antenna arrangement operates in an omni-directional antenna mode;
   wherein in the second operational position, the antenna arrangement operates in a directional antenna mode; and
   wherein in the first operational position the antenna arrangement is perpendicular with the signal reflecting member and in the second operational position the antenna arrangement is parallel with the signal reflecting member.

2. The antenna system of claim 1 wherein the antenna arrangement comprises a diversity pair of omni-directional antennas.

3. The antenna system of claim 2 wherein the diversity pair of omni-directional antennas is formed on a circuit board.

4. The antenna system of claim 1 further comprising a switch for detecting whether the antenna arrangement is in a respective one of the first operational position, for enabling the omni-directional antenna mode, and the second operational position, for enabling the directional operational mode.

5. The antenna system of claim 4, further comprising a media access control processor operably coupled to the switch and configured to operate at a first power level when the switch is in the first operational position and at a second power level when the switch is in the second operational position.

6. The antenna system of claim 5, wherein the second power level is higher than the first power level.

7. The antenna system of claim 1, wherein in the second operational position, the antenna arrangement is substantially proximate to the signal reflecting member to provide a signal reflection from the antenna arrangement.

8. The antenna system of claim 1 wherein the signal reflecting member is formed integrally with a metal housing.

9. The antenna system of claim 1 wherein the antenna system is incorporated in a wireless access point for use with a wireless local area network.

10. The antenna system of claim 1, wherein in the first operational position the antenna system radiates parallel to the reflective surface and in the second operational position the antenna system radiates perpendicular to the reflective surface.

11. A wireless access point for a wireless local area network comprising:
    a radio component comprising suitable radio electronics circuitry for converting electronic signals back and forth into wireless radio frequency signals;
    an antenna arrangement for transmitting and receiving the wireless radio frequency signals, and configured to selectively vary between first and second operational positions;
    a signal reflecting member positioned to cooperate with the antenna arrangement while the antenna arrangement is in the second operational position, to establish a directional antenna mode configuration that is perpendicular to the signal reflecting member; and
    a hinge coupled to the antenna arrangement for folding the antenna between the first and second operational positions;
    wherein in the first operational position, the antenna arrangement operates in an omni-directional antenna mode;
    wherein in the second operational position, the antenna arrangement operates in a directional antenna mode; and
    wherein in the first operational position the antenna arrangement is perpendicular with the signal reflecting member and in the second operational position the antenna arrangement is parallel with the signal reflecting member.

12. The wireless access point of claim 11 wherein the antenna arrangement comprises a diversity pair of omni-directional antennas.

13. The wireless access point of claim 12 wherein the diversity pair of omni-directional antennas is formed on a circuit board.

14. The wireless access point of claim 12 wherein in the second operational position, the antenna arrangement is substantially proximate to the signal reflecting member, so as to provide a signal reflection from the antenna arrangement.

15. The wireless access point of claim 12 wherein the signal reflecting member is formed integrally with a reflective access point housing.

16. The wireless access point of claim 11 further comprising a switch for detecting whether the antenna arrangement is in a respective one of the first operational position, for enabling the omni-directional antenna mode, and the second operational position, for enabling the directional operational mode.

17. The wireless access point of claim 16, further comprising a media access control processor operably coupled to the switch and configured to operate at a first power level when the switch is in the first operational position and at a second power level when the switch is in the second operational position.

18. The wireless access point of claim 11 wherein the radio component comprises means for converting signals between a wireless protocol and a wired network protocol.

19. The wireless access point of claim 18 wherein the means for converting signals converts from between the IEEE 802.11 wireless protocol and the IEEE 802.3 wired network protocol.

20. In a wireless telecommunications system, a method of antenna operation comprising:
    operating an antenna arrangement in an omni-directional antenna mode while the antenna arrangement is in a first position
    rotating the antenna arrangement, by folding the antenna from the first position to the second position; and operating the antenna arrangement in a directional antenna mode while the antenna arrangement is in the second position;

wherein the antenna arrangement is substantially perpendicular with a signal reflecting member while in the first position; and wherein the antenna arrangement is substantially parallel with the signal reflecting member while in the second position, wherein the signal reflecting member cooperates with the antenna arrangement and establishes a directional configuration by reflecting signals from the antenna arrangement in a direction that is substantially perpendicular to the reflecting member while the antenna arrangement is in the second position.

21. The method of claim 20 wherein the step of providing an antenna arrangement comprises providing a diversity pair of omni-directional antennas.

22. The method of claim 21 wherein the step of providing an antenna arrangement further comprises providing a diversity pair of omni-directional antennas formed on a circuit board.

23. The method of claim 21 further comprising a step of pivotally varying the antenna arrangement between the first and second antenna positions.

24. The method of claim 20 further comprising a step of detecting whether the antenna arrangement is in a respective one of the first operational position, for enabling the omni-directional antenna mode, and the second operational position, for enabling the directional operational mode.

25. The method of claim 24, further comprising setting a power level of a transmitter coupled to the antenna based on whether the detected operational position of the antenna arrangement;

wherein the power level is automatically set to a lower level responsive to determining the detected operational position has changed from the first operational position to the second operational position.

26. The method of claim 20 wherein in the second operational position, the antenna arrangement is substantially proximate to the signal reflecting member, so as to reflect a signal from the antenna arrangement.

* * * * *